United States Patent [19]

Gould

[11] Patent Number: 4,805,981
[45] Date of Patent: Feb. 21, 1989

[54] TELECOMMUNICATIONS CABLE CONTAINING OPTICAL FIBERS

[75] Inventor: Colin A. Gould, Ipswich, England

[73] Assignee: British Telecommunications, plc, London, England

[21] Appl. No.: 798,289

[22] Filed: Nov. 15, 1985

[30] Foreign Application Priority Data

Nov. 15, 1984 [GB] United Kingdom ............... 8428878

[51] Int. Cl.⁴ .............................................. G02B 6/44
[52] U.S. Cl. .................................. 350/96.23; 264/1.5
[58] Field of Search ........................ 350/96.23; 264/1.5

[56] References Cited

U.S. PATENT DOCUMENTS

| 3,766,307 | 10/1973 | Andrews, Jr. | 350/96.23 X |
| 4,113,349 | 9/1978 | Stiles | 350/96.23 |
| 4,409,154 | 10/1983 | Grenat | 264/1.5 |
| 4,469,401 | 9/1984 | Yamazaki et al. | 350/96.23 |

FOREIGN PATENT DOCUMENTS

| 0049156 | 4/1982 | European Pat. Off. | |
| 0147844 | 7/1985 | European Pat. Off. | 350/96.23 |
| A-2298807 | 8/1976 | France | |
| 1371740 | 10/1974 | United Kingdom | 264/1.5 |
| 1538853 | 1/1979 | United Kingdom | |
| A-2086607 | 5/1982 | United Kingdom | |
| 2111898 | 7/1983 | United Kingdom | 264/1.5 |

OTHER PUBLICATIONS

"Plastics in Fibre Optical Cables", Plastics and Rubber International by: W. E. Simpson, pp. 145–149, Aug. vol. 5, No. 4.
IEEE International Conference on Communications, vol. 3, Jun. 13th–17th 1982, pp. 7D.4.1–7D.4.3, L. E. Noane et al, "Submarine Optical Fibre Cable Development in France."

Primary Examiner—John D. Lee
Attorney, Agent, or Firm—Nixon & Vanderhye

[57] ABSTRACT

A submarine telecommunications cable includes a plurality of optical fibers in the bore of an orientated plastics strength member. The cable may have an average density of 0.9 to 4.0 and preferably a neutral buoyancy whereby most of the weight of the cable is carried by the sea. This reduces tension in the cable during laying. The bore of a submarine cable is filled with a solid elastomeric embedding medium which occupies the space between the fibers. This gives a void-free structure which assumes ambient pressure. The strength member may be made from orientated polyethylene. The cable is preferably buried in the sea bed during use.

16 Claims, 3 Drawing Sheets

TELECOMMUNICATIONS CABLE CONTAINING OPTICAL FIBERS

FIELD OF THE INVENTION

This invention relates to submarine telecommunications cables in which the signal channels are provided by a plurality of optical fibres.

BACKGROUND AND SUMMARY OF THE INVENTION

Recent developments in the technology relating to telecommunications and optical fibres make it possible to transmit signals over longer and longer distances without regeneration or amplification. In the present state of the art (mid 1984) it is possible to achieve distances of up to 140km without regeneration. This range is enough for inter-island traffic, e.g. from the south west of England to the Channel Isles. It is envisaged that future improvements in the technology will increase the range. The achievement of practical ranges without the need for regenerators makes possible fundamental changes in submarine cable technology and this invention relates a fundamentally new structure which is particularly appropriate for submarine telecommunications cables.

According to this invention, a submarine telecommunications cable comprises a plurality of optical fibres contained in the bore of a tubular strength member made of longitudinally-orientated thermoplastic polymer, e.g. polyethylene, wherein the fibres are embedded in an embedding medium which fills the space in the bore not occupied by the fibres. The embedding medium may serve a plurality of functions as described below.

It is intended that the whole cable shall be at substantially ambient pressure, i.e., at atmospheric pressure before it is laid and at hydrostatic pressure when it is on the sea bed. This permits the use of a less massive structure, but it is necessary to avoid voids which would collapse under the hydrostatic pressure.

It is preferred that each fibre is embedded directly in the embedding medium, preferably an elastomeric solid, e.g. a silicone elastomer. It is conventional to coat the surface of an optical fibre with a protective material, e.g. a silicone elastomer. The embedding medium also fulfills the function of these coatings and the materials used for the coatings are suitable the embedding medium. In addition, the embedding medium helps to locate the fibres in the centre of the bore.

The embedding medium also fulfills an emergency function in case the cable is accidentally damaged while submerged. If the damage permits access of the sea to the bore then the embedding medium prevents substantial entry of water and, especially, it prevents the water spreading for long distances.

The average density of the whole cable is an important aspect of the invention. Preferably the average density is in the range 0.9 to 4 g cm$^{-2}$, e.g. 0.9 to 1.50 g cm$^{-3}$.

Thus the invention differs from conventional technology, which utilizes massive cables, by the use of cables with low density, e.g. with substantially neutral buoyancy, e.g. average densities in the range 0.9 to 1.2 g cm$^{-3}$. Recent developments provide means for burying cables in the sea bed and a buried cable will remain at the bottom even if it has positive buoyancy. Thus, where a cable has substantially neutral buoyancy, it is not important whether the residual buoyancy is positive or negative.

Cables with substantially neutral buoyancy have only a small weight in water which implies that they encounter loads substantially less than the loads of conventional (massive) cables. Breaking loads as low as 10 kg would be suitable for some applications, e.g. inland applications, but breaking loads of at least 100 kg, or preferably 500 kg, are needed for most submarine applications. On the other hand, it is considered that a breaking load of 3000 kg would be more than ample for almost all submarine applications, especially with non-massive cables. Breaking loads of 1000 kg would be adequate for most submarine applications and 2000 kg would be adequate even for those applications where high strengths are appropriate.

The tensile strength of the cable is substantially the strength of the strength member because the core element, i.e. the fibres and the embedding medium, make negligible contribution to the tensile strength.

A cable according to the invention may include extra components, i.e. components in addition to the optical fibres, the strength member and the embedding medium. Examples of extra components include, king filaments, claddings, and metal strands. Eachof these three extras will be separately described.

King filaments are often used in optical fibre cables to enhance the mechanical stability of the glass fibre package. A cable usually contains six optical fibres and these are arranged in contact with one another in a hexagonal pattern. To enhance the stability, especially during the assembly of the cable, the optical fibres are arranged around an additional filament usually called the "king filament" or, in the case of a metal filament, the "king wire". In cables according to the invention the king filament may be of a plastics material, e.g polyethylene, or preferably of glass, e.g. a seventh optical fibre.

Claddings are abrasion resistant external layers intended to protect the cable, especially during laying and handling. The claddings are conveniently of abrasion resistant thermoplastics for application by extrusion to completed cables. The use of a cladding reduces the incidence of failure because damage which is limited to the cladding has no effect on telecommunications performance.

Metal wires may be provided in case it is necessary to locate a cable on the sea bed. Location systems exist in which underwater electromagnetic detectors respond to electrical signals in conductive parts of the cable. When necessary, suitable signals are applied to the metal wires. Also, e.g. where cables according to the invention are used over distances greater than 40km, it might be desired to incorporate powered elements, e.g. regenerators and/or amplifiers, into the system. The metal wires mentioned above are suitable for providing electrical power where necessary.

Conveniently the metal wires are located between the strength member and the cladding. Although the purpose of the metal wires is to provide a path for electrical location signals or electrical power they have additional effects, e.g. increasing the tensile strength and increasing the average density. It is emphasized that any strands which may carry tension should be laid straight and not in a helical lay as is conventional in cable technology. The helical lay may cause unacceptable twisting in the cable (and conventional technology uses complicated torsionally balanced structures to avoid this).

Straight strands do not cause twist but they may make only a small contribution to the strength.

Most surprisingly, a submarine cable according to this invention provides the appropriate strength, pressure resistance and water exclusion with a simple structure. Although some of its components resemble components of cables disclosed in the prior art, the cable has a novel structure. DE OLS No. 3201981 describes a heat resistant cable with a different and complicated tubular member. The fibres, which are contained in the bore of the tube, are enveloped in, for example, a silicone rubber. GB No. 2099179 describes cables with metal reinforcement. The cable includes glass fibres, each having at least one coating layer and twisted together at the desired pitch. The fibres are embedded, e.g. in a silicone resin. GB 1461540 describes a cable with non-orientated tube which includes a fibrous element in its wall. The fibres are contained in the bore of the tube.

BRIEF DESCRIPTION OF THE DRAWINGS

The invention will now be described by way of example with reference to the accompanying diagrammatic drawings (which are not to scale) in which.

DETAILED DESCRIPTION

Figure 1:
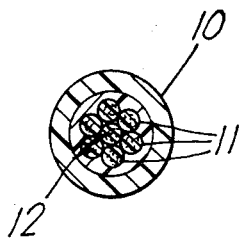
FIG. 1 is a transverse cross section through a cable according to the invention.

The cable shown in FIG. 1 comprises a tubular strenth member 10 having an external diameter in the range 1 to cm. The tubular strength member 10 is formed of longitudinally orientated polyethylene.

The bore of the tube 10 is filled with a core member comprising six glass fibres 11 surrounding a king filament 12, which is preferably a seventh glass fibre. The bore also contains an embedding medium, e.g. a silicone elastomer, which completely fills the space between the fibres 11 and the king filament 12. Each of the glass fibres typically has a diameter of 125 $\mu$m and each provides a path for the transmission of optical telecommunications signals.

It is conventional to coat individual optical fibres with silicone elastomers; these silicone elastomers are very suitable for use as the embedding medium.

Figure 2:
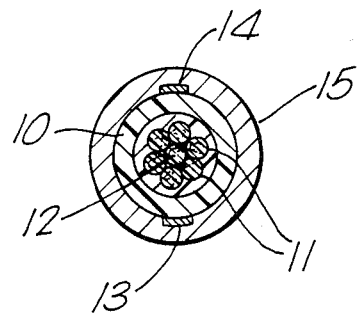
FIG. 2 is a transverse cross section through a modified version of the cable.
Figure 3:
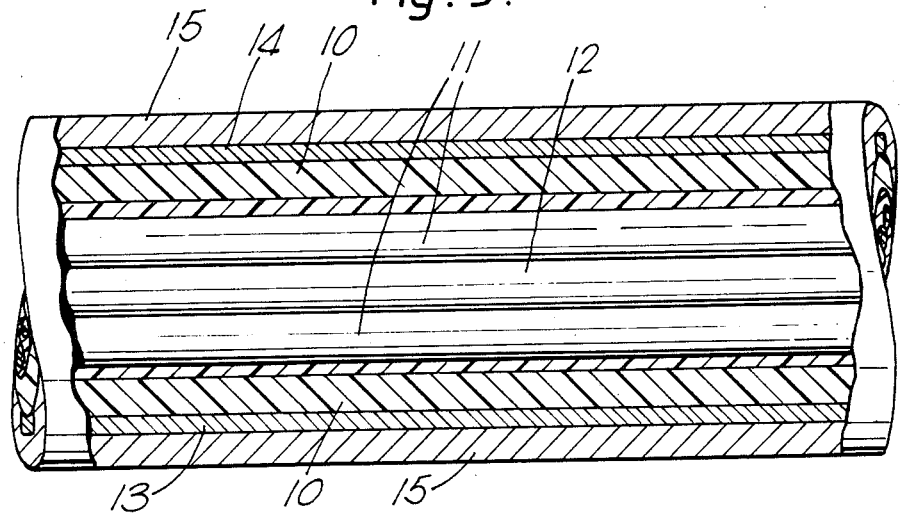
FIG. 3 is a longitudinal cross section through the cable shown in FIG. 2.

FIGS. 2 and 3 show a modification in which the cable of FIG. 1 is surrounded by an abrasion resistant cladding 15. Two straight wires 13 and 14 are located between the cladding 15 and the strength member 10. Should it be necessary to locate the cable on the sea bed a location signal is applied to wires 13 and/or 14 from one end, i.e. the signal is applied from the shore. Even if the cable is broken in one place both portions can be located by applying location signals from each end. Also. the wires 13 and 14 can be used should it be desired to provide electrical power in the cable.

When cables according to the invention are laid it is preferred to locate them in trenches ploughed in the sea bed.

A suitable method for making submarine cables according to the invention will not be described. This method comprises two separate stages. In the first stage the (separate) optical fibres are incorporated into the embedding medium to form a communications filament which consists of the fibres and embedding medium. In the second stage the strength member is pultruded around the communications filament. More specifically, the second stage comprises three steps namely:
(i) Conventional cross-head extrusion of a tube around the filament. The filament is left loose inside a wide bore to allow for contraction when the tube is stretched for orientation.
(ii) Orientating the strength member by stretching as described in UK patent specification GB No. 2060469B. The size of the tube is chosen to allow a small annulus even after stretching whereby the communications filament is not affected by the extrusion or orientation.
(iii) Introducing elastomer precursor into the annulus where it is cured and cross-links to form an embedding medium filling the annulus.

The preparation of the communication filament will be further described with reference to FIG. 4 and its incorporation in the strength member with reference to FIG. 5.

In this example the embedding compound was "SYLGARD" a commercially available silicone elastomer widely used to coat optical fibres. It is available as a precursor which is a viscous fluid which cross-links under the influence of heat to form a solid elastomer. The communications filament is formed from seven commercially available glass fibres having a diameter of 125 $\mu$m and each having its own "SYLGARD" sheath which adheres to its surface. These sheaths are applied when the fibre is made; coloured sheaths are available if colour-coded cable is required. The diameter of the sheathed fibre is 250 $\mu$m. Seven fibres are arranged with their sheaths in contact in the arrangement shown in FIG. 2. The diameter of the composite of seven fibres is about 750$\mu$m.

Figure 4:
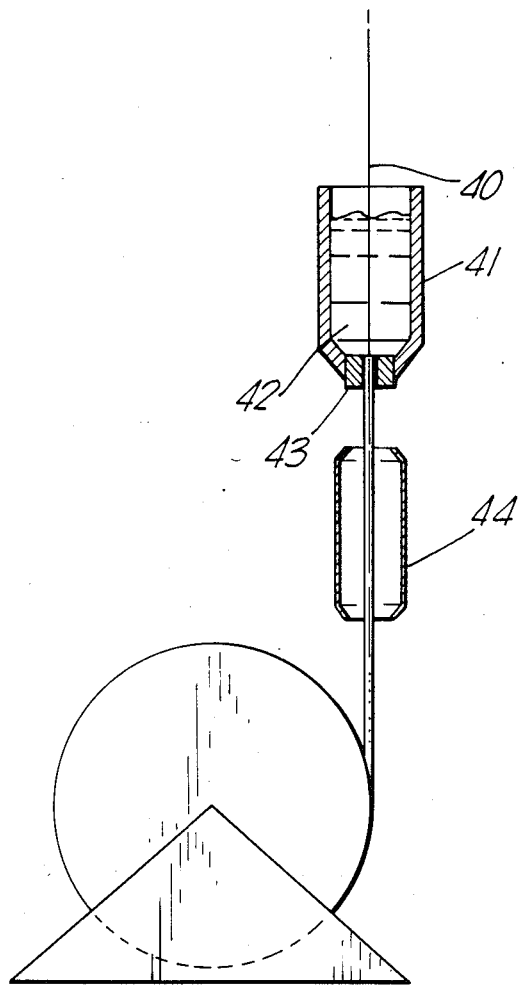
FIG. 4 illustrates the formation of a communications filament.

FIG. 4 illustrates the embedding of a composite 40 of seven glass fibres to form a communications filament. The composite 40 is formed by unreeling seven fibres from seven reels under constant tension conditions; this part of the process is not shown in the drawing. The composite 40 passes into a vertical cylindrical bath 41 which contains the viscous precursor 42 of the elastomeric solid; a constant level is maintained by suitable means (not shown). A die 43 is positioned at the base of the bath 41. The die 43 has a diameter of 1 mm. The liquid precursor 42 fills the interstital spaces between the sheathed fibres and it (the precursor) is drawn out through the die 43 by the motion of the composite. Because the precursor is viscous it is shaped by the die 43 into a filament of diamater 1 mm. The filament issuing from die 43 is heated by heater 44 causing the precursor to harden into a solid elastomer. Because the hardening is rapid compared with the flow rate the result is a solid elastomeric filament with external diameter 1 mm with seven glass fibres embedded therein. There is an outer layer about 125 $\mu$m thick with no glass fibres. The glass fibres are parallel to the filament axis and contained in a central core of which the diameter is around 750 $\mu$m. (Extra layers of "SYLGARD" can be applied, e.g. by repetition of the described coating process. In this way filaments up to 2 mm diameter, or larger if required, can be prepared.)

Fibre is usually supplied in minimum lengths of 2.2 km but splicing enables longer lengths, as long as needed, of filament to be prepared. The filament can be tested before incorporation in a cable.

Figure 5:
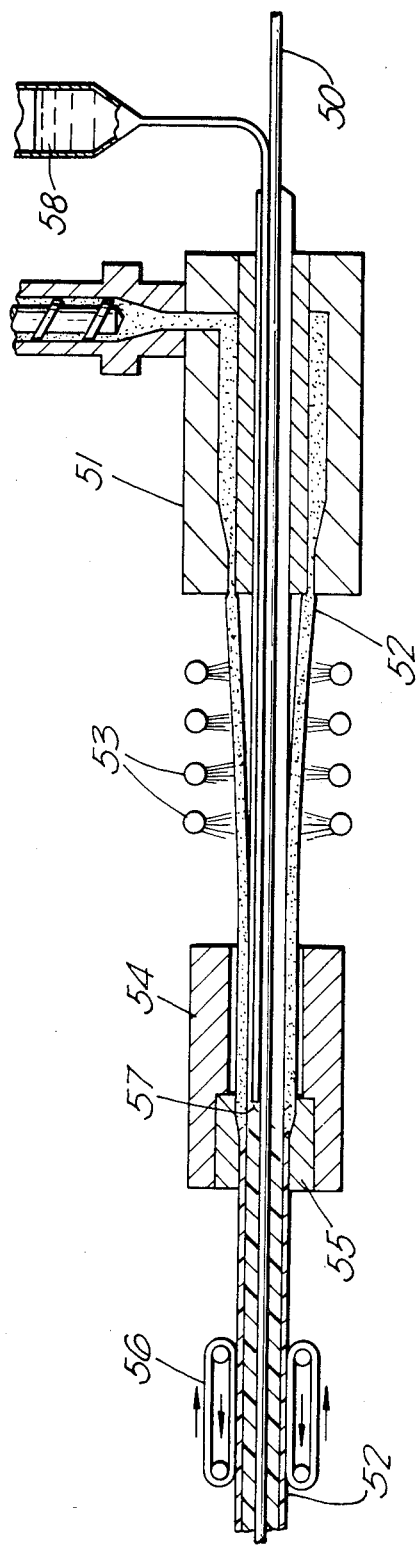
FIG. 5 illustrates a preferred preparation of the cable employing a pultrusion technique.

As shown in FIG. 5, the communications filament 50 is passed through the centre of a conventional cross-head extruder 51 which produces a polyethylene tube 52 around the filament. The extrudate is water, or alternatively air, cooled by coolers 53 to about 100° C. and then it passes into the prior annealing oven 54 where the temperature of the extrudate and filament is raised to from 10° C. to 112° C. over a period of about 2 minutes (the exact temperature is dependent on the precise composition of the extrudate). At the end of the annealing oven 54 the extrudate passes through drawing die 55. The temperature of the drawing die was 100° C. for the present example, but again the selected temperature, which must be carefully controlled, is dependent on the extrudate composition. The tube 52 is pulled out of drawing die 55 (hence pultrusion) by haul-off 56 running at eight to sixteen times the extrusion speed so that the tube 52 is orientated by stretching in the ratio 1:8 to 1:16.

Drawing at such ratios typically leaves a small annular gap between the communications filament 50 and the wall of tube 52. It is necessary to fill this gap with "SYLGARD". This is achieved by means of capillary tube 57 which extends as far as drawing die 55 and is fed at a constant rate from pressurised hopper 58. "SYLGARD" precursor is introduced into the annular cavity via capillary 57. The residual heat in tube 52 can be employed to cure the precursor achieve cross-linking with the solid elastomer of the filament thereby filling the annular cavity. After drawing the tubular member has a diameter in the range 10 to 20 mm.

The following points about the processes should be noted:

(i) The uniting of seven glass fibres into one filament simplifies further processing.
(ii) Cross-head extrusion around a single filament is well established in plastics technology. The fact that the filament is introduced into a wide bore simplifies the process.
(iii) The orientation process is described in UK patent specification GB No. 2060469B. The leaving of a small gap even after the pultrusion simplifies processing.
(iv) The introduction of a precursor is a simple way of filling the gap remaining after orientation.

Using the techniques described above submarine cables were prepared using three polymers, namely:-
(a) An ethylene homopolymer, of medium molecular weight supplied by British Petroleum under code 006-60.
(b) An ethylene copolymer having weight average molecular weight 150000 and number average molecular weight 22000. This was supplied by British Petroleum under code 002-47.
(c) A propylene homopolymer having a melt flow index 0.8 supplied by Imperial Chemical Industries under code GSE 108.

All the cables were close to neutral buoyance in sea water.

Using time (b) a cable with the following parameters was obtained:

| | |
|---|---|
| Outer diameter | 15 mm |
| Bore diameter | 1 mm |
| Breaking load | ca 2000 Kg |

| | |
|---|---|
| -continued | |
| Youngs Modulus at 1% strain | 8 G pa. |

If desired the cable may be surrounded by abrasion resistant cladding and electrically conductive members may be incorporated.

It will be appreciated that the drawing ratio for the outer tube is not restricted to the 1:8 to 1:16 range described above. In particular, by carefully controlling the pultrusion at a higher drawing ratio the outer tube may be drawn tight, slightly compressing the elastomer of the filament, thereby eliminating any gap and obviating the need for further introduction of precursor in such cases.

I claim:

1. A submarine cable for serving as an undersea communications medium comprising a tubular strength member formed of a longitudinally orientated thermoplastic polymer which strength member contains in its bore a plurality of longitudinally extending optical fibres which are embedded in an embedding composition which occupies the space between the fibres whereby the cable is filled, said cable having efficient strength, water exclusion properties and pressure resistance to provide long term undersea service, wherein the strength member is capable of withstanding breaking loads in the range of 100 kg to 3,000 kg.

2. A sumbarine cable according to claim 1, wherein the embedding composition is an elastomeric solid.

3. A submarine cable according to claim 2, wherein the elastomeric solid is a silicone rubber.

4. A submarine cable according to any one of claims 1 to 3, which contains seven optical fibres.

5. A submarine cable according to claim 4, wherein the seven fibres are arranged with six uniformly spaced around the seventh.

6. A cable according to claim 2, wherein the tubular strength member is surrounded by an abrasion resistant cladding.

7. A submarine cable according to claim 1 wherein the tubular strength member is of orientated polyethylene.

8. A submarine cable according to claim 1 wherein the breaking strain is 1,000kg to 2,000kg.

9. A submarine cable according to claim 1, wherein the density of the cable is in the range 0.9 to 4 g cm$^{-3}$.

10. A submarine cable according to claim 9, wherein the density is in the range 0.9 to 1.5 g cm$^{-3}$.

11. A cable according to claim 1, wherein said tubular strength member is surrounded by an abrasion resistant cladding, said cable further including longitudinally extending electrically conductive elements situated between the cladding and the strength member.

12. A method of making a submarine cable having a tubular strength member formed of a longitudinally orientated thermoplastic polymer which strength member contains in its bore a plurality of longitudinally extending optical fibres which are embedded in an embedding composition which occupies the space between the fibres whereby the cable is filed, said method comprising the steps of:
(a) extruding a thermoplastic tube to form the strength member around a single filament which includes the plurality of optical fibres embedded in an embedding composition, the bore of said tube being larger than the filament;

(b) orientating said tube by pultruding and thereby stretching it to enhance its tensile strength and to reduce the size of the bore; and (c) introducing a fluid precursor into the bore at or near the stretch zone and hardening said precursor in situ so as to fill the gap left after step (b) to thereby generate a submarine cable wherein the strength member is capable of withstanding breaking loads in the range of 100 kg to 3,000 kg.

13. A submarine cable for serving as an undersea communications medium comprising: a tubular strength member formed of a longitudinally orientated thermoplastic polymer which strength member is capable of withstanding breaking loads in the range of 100kg to 3000kg and which contains in its bore a plurality of longitudinally extending optical fibres which are embedded in an embedding composition which occupies the space between the fibres, whereby the cable is filled, said cable having a density in the range of 0.9 to 4 g $cm^{-3}$, said cable having sufficient strength, water exclusion properties and pressure resistance to provide long term undersea service.

14. A submarine cable for serving as an undersea communications medium comprising: a tubular strength member surrounded by an abrasion resistant cladding, said tubular strength member being formed of a longitudinally orientated thermoplastic polymer which strength member is capable of withstanding breaking loads in the range of 100kg to 3000kg and which contains in its bore a plurality of longitudinally extending optical fibres which are embedded in an embedding composition which occupies the space between the fibres, whereby the cable is filled, said cable having a density in the range of 0.9 to 4 gm $cm^{-3}$, said cable having sufficient strength, water exclusion properties and pressure resistance to provide long term undersea service.

15. A submarine cable for serving as an undersea communications medium comprising: a tubular strength member surrounded by an abrasion resistant cladding, said tubular strength member being formed of a longitudinally orientated thermoplastic polymer which strength member contains in its bore a plurality of longitudinally extending optical fibres which are embedded in an embedding composition which occupies the space between the fibres, whereby the cable is filled, said cable having sufficient strength, water exclusion properties and pressure resistance to provide long term undersea service, wherein the strength member is capable of withstanding breaking loads of at least 100 kg to 3,000 kg.

16. A submarine cable for serving as an undersea communications medium comprising: a tubular strength member formed of a longitudinally orientated thermoplastic polymer which strength member is capable of withstanding breaking loads in the range of 1000kg to 2000kg and which contains in its bore a plurality of longitudinally extending optical fibres which are embedded in an embedding composition which occupies the space between the fibres, whereby the cable is filled, said cable having a density in the range of 0.9 to 1.5 g $cm^{-3}$, said cable having sufficient strength, water exclusion properties and pressure resistance to provide long term undersea service.

* * * * *